US012118659B2

(12) United States Patent
Kumar et al.

(10) Patent No.: US 12,118,659 B2
(45) Date of Patent: Oct. 15, 2024

(54) EFFICIENT RENDERING OF CLIPPING OBJECTS

(71) Applicant: Adobe Inc., San Jose, CA (US)

(72) Inventors: Harish Kumar, Noida (IN); Apurva Kumar, Patna (IN)

(73) Assignee: Adobe Inc., San Jose, CA (US)

( * ) Notice: Subject to any disclaimer, the term of this patent is extended or adjusted under 35 U.S.C. 154(b) by 192 days.

(21) Appl. No.: 18/058,120

(22) Filed: Nov. 22, 2022

(65) Prior Publication Data

US 2024/0185513 A1    Jun. 6, 2024

(51) Int. Cl.
*G06T 15/30* (2011.01)
(52) U.S. Cl.
CPC .................... *G06T 15/30* (2013.01)
(58) Field of Classification Search
CPC .................................................. G06T 15/30
See application file for complete search history.

(56) References Cited

U.S. PATENT DOCUMENTS

| 6,043,824 A * | 3/2000 | Bier | G06T 11/00 345/441 |
| 2006/0001679 A1* | 1/2006 | Hamburg | G06T 11/60 345/620 |
| 2012/0008830 A1* | 1/2012 | Yoshii | G06T 7/74 382/103 |

* cited by examiner

*Primary Examiner* — Xin Sheng
(74) *Attorney, Agent, or Firm* — FIG. 1 Patents

(57) ABSTRACT

In implementations of systems for efficient rendering of clipping objects, a computing device implements a clipping system to generate a clipping tree that includes a root node and a node for each clipping group included in a layer of an input render tree. The clipping system generates a segment buffer having rows that each represent coverage of a branch of the clipping tree and columns that each represent coverage of a level of the clipping tree. The segment buffer is mapped to two-dimensional array, and the clipping system computes coverage for a clipping object of a clipping group included in the layer of the input render tree based on an identifier of a row of the two-dimensional array.

20 Claims, 11 Drawing Sheets

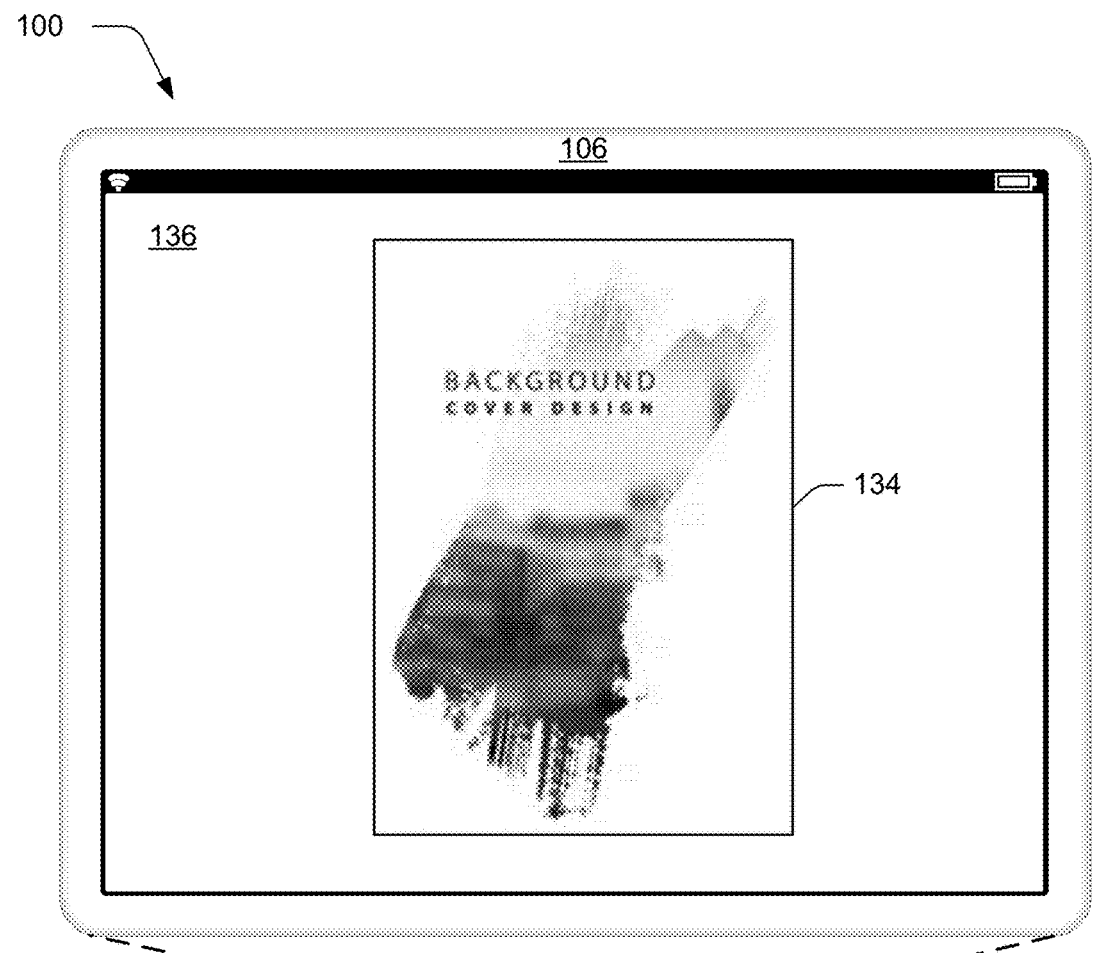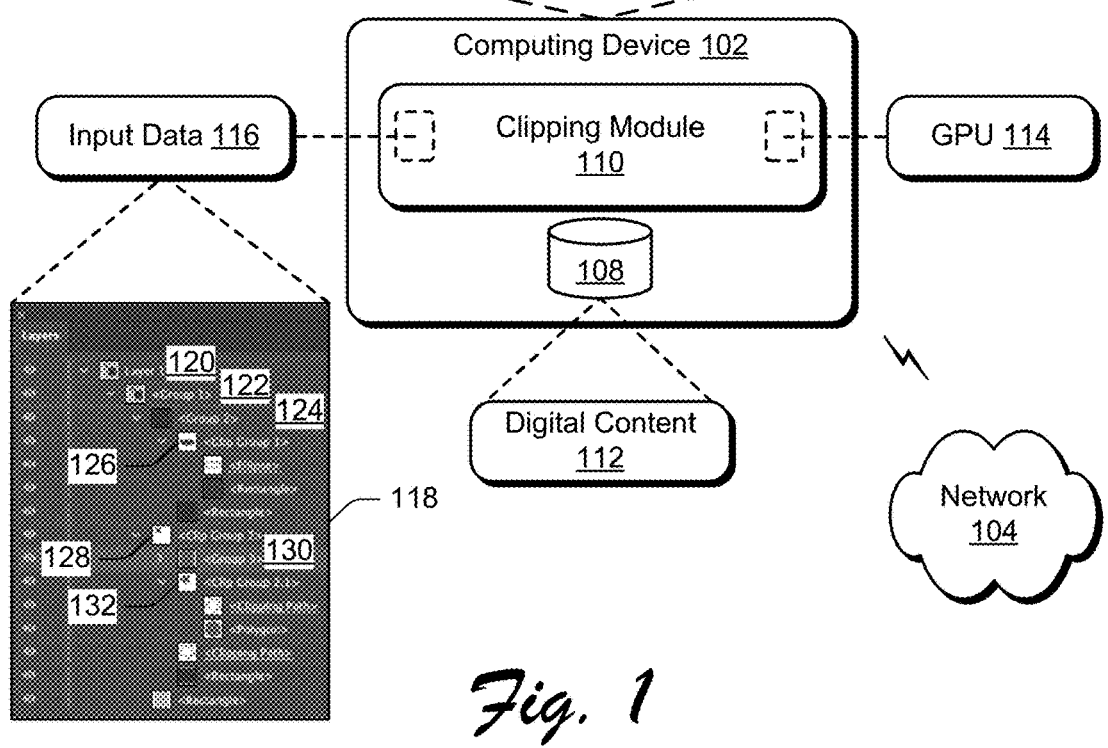
Fig. 1

800

802
Generate a clipping tree having nodes corresponding to clipping groups included in an input render tree

804
Generate a segment buffer having rows that each represent coverage of a branch of the clipping tree and columns the each represent coverage of a level of the clipping tree

806
Extract a row from the segment buffer based on a row identifier of the row

808
Compute coverage for a clipping object of a clipping group included in the input render tree using a bit mask that masks out bits included in the row that do not contribute to the coverage for the clipping object

*Fig. 8*

EFFICIENT RENDERING OF CLIPPING OBJECTS

BACKGROUND

A clipping object (or clipping mask) is a type of digital object that defines a visible portion of underlying digital artwork based on a boundary (e.g., a shape) of the clipping object. The boundary "clips" the underlying digital artwork such that the visible portion is disposed within the boundary and a remaining portion of the underlying digital artwork that is disposed outside of the boundary is not visible. Accordingly, clipping objects are commonly used for masking out a background portion of a digital image or for extracting a foreground portion of the digital image, for example, to include in another digital image.

SUMMARY

Techniques and systems for efficient rendering of clipping objects are described. In an example, a computing device implements a clipping system to generate a clipping tree which includes a node for each clipping group included a layer of an input render tree. In this example, the clipping tree preserves a relative hierarchy of the clipping groups included in the layer of the input render tree.

The clipping system generates a segment buffer having rows that each represent coverage of a branch of the clipping tree and columns that each represent coverage of a level of the clipping tree. The segment buffer is mapped to a two-dimensional array such as a texture array or a different type of buffer/array. The clipping system computes coverage for a clipping object of a clipping group included in the layer of the input render tree based on an identifier of a row the two-dimensional array (or an identifier of a row of the different type of buffer/array).

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ digital systems and techniques for efficient rendering of clipping objects as described herein.

FIG. 8 is a flow diagram depicting a procedure in an example implementation in which coverage for a clipping object of a clipping group included in an input render tree is computed using a bit mask that masks out bits included in a row that do not contribute to the coverage for the clipping object.

DETAILED DESCRIPTION

Overview

Figure 2:
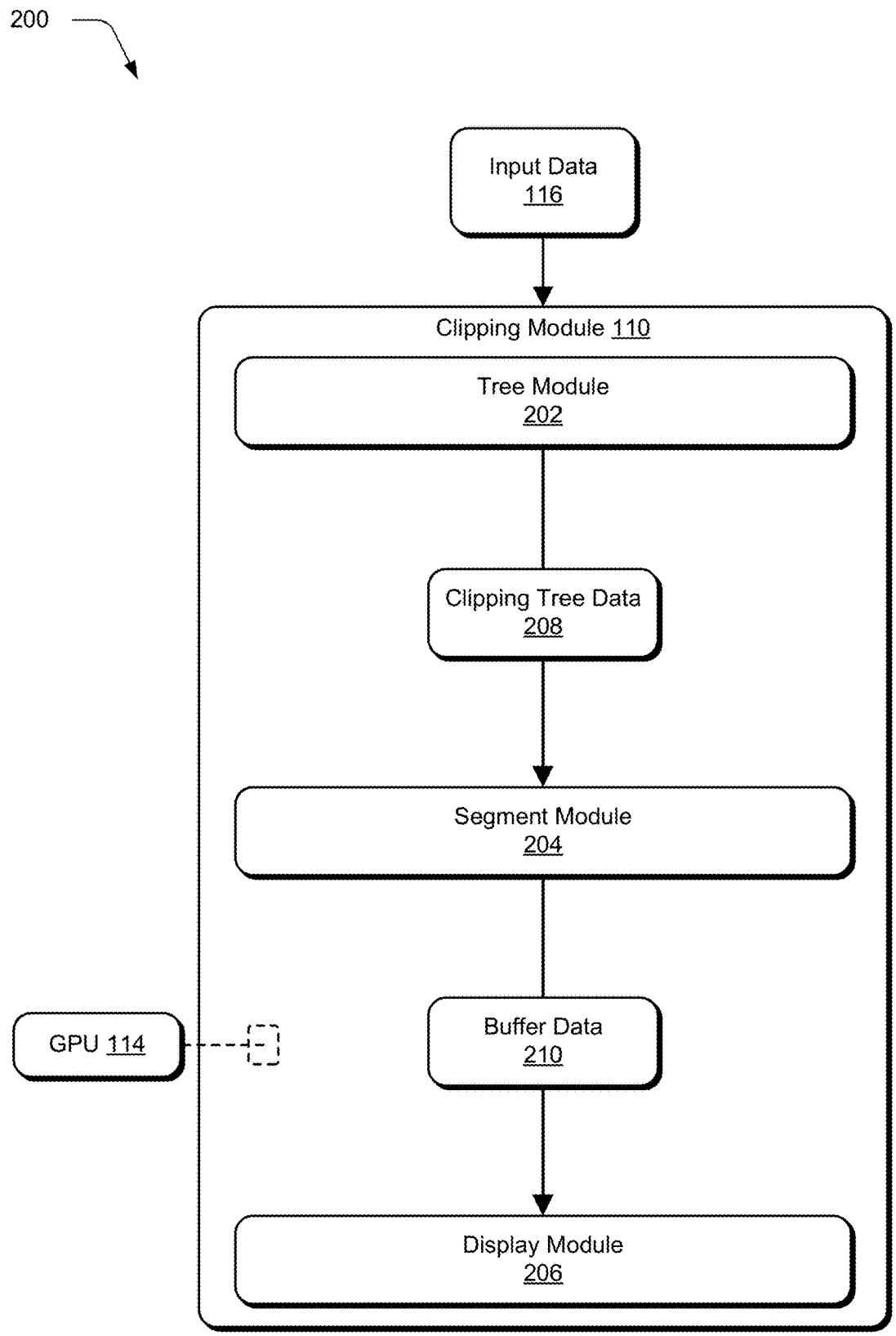
FIG. 2 depicts a system in an example implementation showing operation of a clipping module for efficient rendering of clipping objects.

A clipping object (a clipping mask) is a type of digital object that defines a visible portion of underlying digital artwork (a clipped object). The visible portion of the underlying digital artwork (the clipped object) is disposed within a boundary of the clipping object (e.g., within the clipping mask), and the boundary "clips" a remaining portion of the underlying digital artwork that is outside of the boundary such that the remaining portion is not visible. In order to determine whether a particular pixel of the underlying digital artwork is completely visible, partially visible, or completely "clipped" and not visible, it is necessary for outputs of rendering the clipping object to be completed prior to drawing the clipped object. This introduces a read-after-write dependency in conventional systems for rendering clipping objects which is inefficient and causes stalls and performance bottlenecks in the conventional systems.

In order to overcome these limitations, techniques and systems for efficient rendering of clipping objects are described. In one example, a computing device implements a clipping system to generate a clipping tree based on clipping groups included in a layer of an input render tree. For example, the clipping groups each include a single clipping object or multiple clipping objects. The clipping system generates the clipping tree as having one node for each clipping group included in the layer which preserves a relative hierarchy of the clipping groups in the input render tree. This relative hierarchy is defined by branches (e.g., columns) and levels (e.g., rows) of the clipping tree.

In an example, the clipping system generates a segment buffer based on the clipping tree. In this example, the segment buffer has rows that each represent coverage of a branch (e.g., a column) of the clipping tree and the segment buffer has columns that each represent coverage of a level (e.g., a row) of the clipping tree. The clipping system maps the segment buffer to a two-dimensional array such as a texture array or a different type of buffer/array. In one example, the clipping system uses color channels in each plane of the texture array to act as columns of the segment buffer and uses color planes of the texture array to act as rows of the segment buffer.

For example, the input render tree is processed in a standard z-order and each node of the input render tree includes a unique identifier of a nearest clipping group in its parent hierarchy. The clipping system maps each unique identifier to a location in the two-dimensional array and/or the segment buffer that stores coverage for a clipping group corresponding to the unique identifier. In order to compute coverage for a particular clipping object, the clipping system extracts a row from the two-dimensional array and/or the segment buffer based on a row identifier of a clipping group that includes the particular clipping object.

In an example, the clipping system applies a bit mask to the row that masks out bits included in the row that do not contribute to coverage for the clipping group that includes the particular clipping object. After applying the bit mask, remaining bits in the row contribute to coverage for the clipping group, and the clipping system computes final coverage for the clipping group by shifting the remaining bits in the row based on a column identifier and a bit offset (e.g., a size of a segment of the segment buffer). The clipping system determines coverage for the particular clipping object based on the final coverage for the clipping group which is usable to render the clipping object without the read-after-write dependency that limits conventional rendering systems.

By leveraging the clipping tree and the segment buffer to render clipping objects efficiently, the described systems are capable of increasing a display rate of clipping objects rendered using conventional systems by nearly 500 percent. This improvement is particularly significant for rendering clipping objects in network-based and web-based applications in which direct access to hardware is typically limited by a browser layer. The described systems are also capable of "rewinding" the segment buffer to improve rendering performance for scenarios in which a number of branches of the clipping tree exceeds a number of available rows of the segment buffer or a number of levels of the clipping tree exceeds a number of available columns of the segment buffer which is also not possible in conventional rendering systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For example, the display device 106 is an ultra-high-definition display device having a display resolution of 4K, 5K, 8K, etc. The computing device 102 includes a storage device 108 and a clipping module 110. The storage device 108 is illustrated to include digital content 112 such as digital images, digital artwork, digital videos, etc.

The computing device 102 and/or the clipping module 110 have access to a graphics processing unit (GPU) 114 which is representative of multiple GPUs 114 in some examples. In one example, the computing device 102 includes the GPU 114 in addition to a central processing unit (CPU). In another example, the GPU is available to the computing device 102 and the clipping module 110 via the network 104. For example, the computing device 102 and the clipping module 110 leverage the GPU 114 (e.g., GPU 114 computing kernels) for processing and rendering digital content 112 and/or for processing data in series or parallel with the CPU such as in a CPU-GPU 114 framework. In an example, this includes leveraging multiple CPUs and/or multiple GPUs 114.

The clipping module 110 is illustrated as having, receiving, and/or transmitting input data 116 describing an input render tree 118. As shown, the input render tree 118 includes a layer 120, and a first group 122 is included in the layer 120. For instance, a second group 124 is included in the first group 122 and a first clipping group 126 is included in the second group 124. The first group 122 also includes a second clipping group 128 that includes a third group 130 and a third clipping group 132.

In an example, the clipping module 110 receives and processes the input data 116 to generate a clipping tree that only includes nodes corresponding to clipping groups included in the input render tree 118 and preserves a relative hierarchy of the clipping groups in the input render tree 118. In this example, the clipping tree includes a node for the layer 120 and has a first layer that includes a node for the first clipping group 126 and a node for the second clipping group 128. The clipping tree has a second layer that includes a node for the third clipping group 132. For example, the clipping module 110 generates the clipping tree as having a first branch that includes the node for the first clipping group 126 and a second branch that includes the node for the second clipping group 128 and the node for the third clipping group 132.

After generating the clipping tree, the clipping module 110 uses the clipping tree to generate a segment buffer which is a two-dimensional matrix of segments that are each denoted by a row index and a column index. In one example, the segments are read from or written to the matrix by shaders or GPU kernels (e.g., of the GPU 114). In this example, every row of the segment buffer stores coverage of one branch of the clipping tree and every column of the segment buffer stores coverage of one level of the clipping tree. A leftmost column of the segment buffer stores coverage of nodes present at a bottommost level of the clipping tree.

The clipping module 110 maps the segment buffer to graphics primitives using a two-dimensional array (e.g., a texture array). In an example, the clipping module 110 uses color channels of each plane of a texture array to act as the columns of the segment buffer and color planes of the texture array to act as the rows of the segment buffer. Consider an example in which write operations are performed from fragment shaders of a draw call executed for each of the clipping groups included in the input render tree 118. In this example, a render call is passed additional information to locate a segment in the texture array to write coverage for each of the clipping groups included in the input render tree 118. For instance, the row indices and column indices used to denote the segments of the segment buffer are transformed into corresponding fragment coordinates and color plane indices which are sent to the fragment shaders.

In an example in which the input render tree 118 is processed in standard z-order, the clipping module 110 assigns a unique identifier to the first clipping group 126, the second clipping group 128, and the third clipping group 132, and stores a mapping from the unique identifiers to corresponding locations in the segment buffer storing coverage for the first, second, and third clipping groups 126, 128, 132. In order to compute coverage for a clipping object included in, for example, the second clipping group 128, the clipping module 110 first extracts a row from the two-dimensional array having a row identifier associated with the second clipping group 128. The clipping module 110 then uses a bit mask to mask out bits included in the row that do not contribute to the coverage for the clipping object. For example, the clipping module 110 computes final coverage for the clipping object by shifting the non-masked bits in the row (e.g., a right shift) based on a column identifier and an offset.

After computing the final coverage for the clipping object, the clipping module 110 utilizes the computed final coverage to efficiently render a digital image 134 which is displayed in a user interface 136 of the display device 106 and includes the clipping object. As shown, the clipping object of the digital image 134 masks a clipped object depicting a blurred image of buildings in a final output depicted by the digital image 134. By generating the clipping tree and the segment buffer to compute the coverage for the clipping object in this manner, the clipping module 110 removes a read-after-write dependency caused by computing coverage for a pixel based on coverage of a clipped path as well as coverage of a clipping path at the pixel in conventional rendering techniques. Unlike conventional techniques, the clipping module 110 draws the input render tree 118 by indexing into the segment buffer during a fragment shader stage of the graphics pipeline which significantly increases a display rate for the digital image 134 in the user interface 136 relative to rendering the digital image 134 using the conventional techniques.

FIG. 2 depicts a system 200 in an example implementation showing operation of a clipping module 110. The clipping module 110 is illustrated to include a tree module 202, a segment module 204, and a display module 206. In an example, the tree module 202 receives and processes the input data 116 to generate clipping tree data 208.

Figure 3:
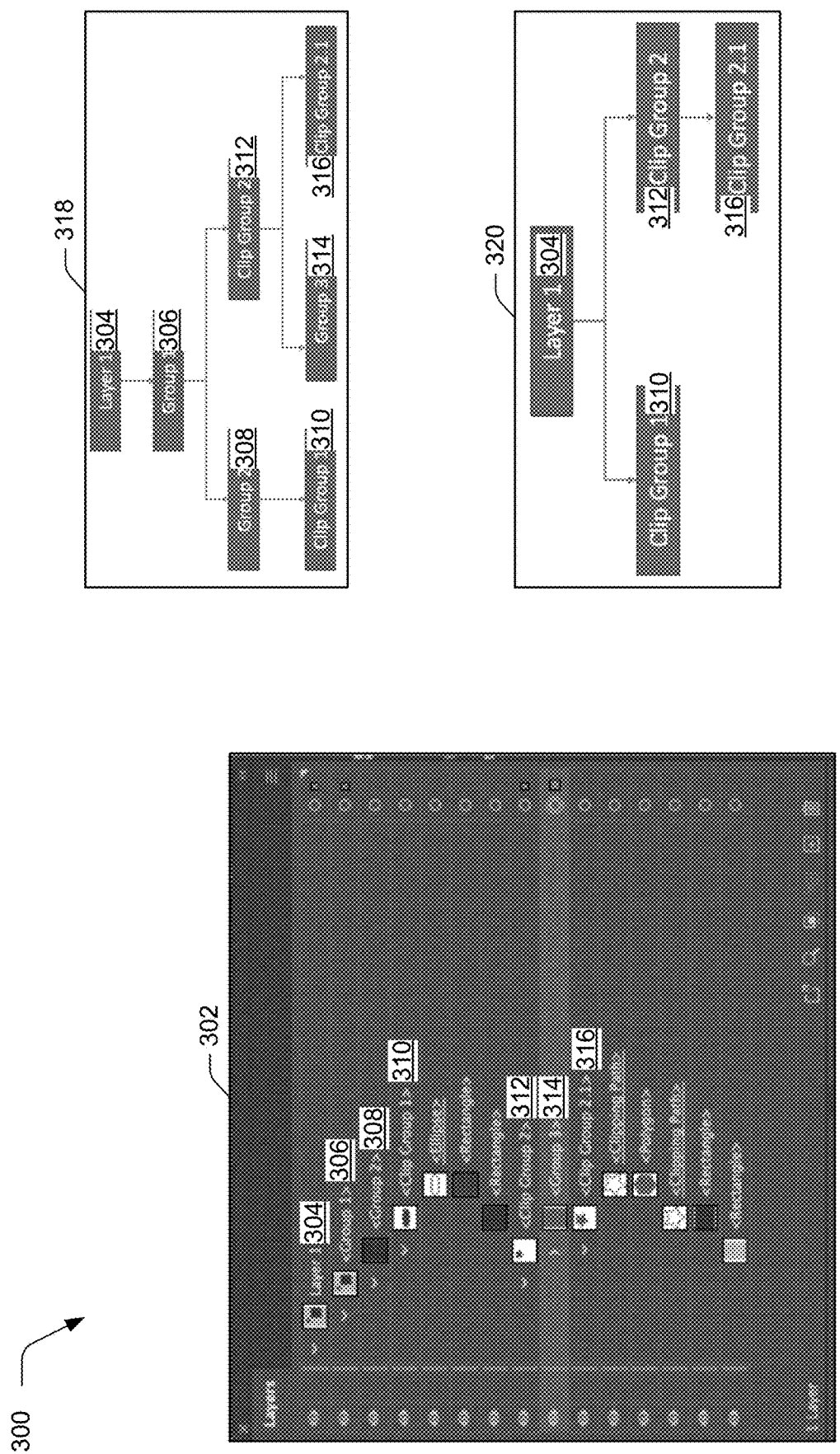
FIG. 3 illustrates a representation of generating a clipping tree based on clipping groups included in an input render tree.

FIG. 3 illustrates a representation 300 of generating a clipping tree based on clipping groups included in an input render tree. As shown, the representation 300 includes an input render tree 302. For instance, the tree module 202 receives the input data 116 as describing the input render tree 302. The input render tree 302 includes a layer 304 having a first group 306. For example, the first group 306 includes a second group 308, and the second group 308 includes a first clipping group 310. The first group 306 also includes a second clipping group 312 which includes a third group 314 and a third clipping group 316.

The representation 300 also includes a render tree 318 that includes nodes which illustrate a relative hierarchy of the first, second, and third groups 306, 308, 314; the first, second, and third clipping groups 310, 312, 316; and the layer 304 in the input render tree 302. For example, the tree module 202 iterates through the nodes of the render tree 318 to generate a clipping tree 320 that only includes nodes for the first, second, and third clipping groups 310, 312, 316. To do so, the tree module 202 first generates a root node for the clipping tree 320 which is the layer 304 because there are multiple children of the layer 304 which are capable of being clipping objects in the render tree 318.

The tree module 202 then iterates through the nodes of the render tree 318 and determines whether the nodes are clipping group nodes. When the tree module 202 identifies one of the nodes of the render tree 318 as being for one of the first, second, and third clipping groups 310, 312, 316, the tree module 202 generates a new node for the clipping tree 320 by cloning all properties of the identified node except for child/parent relations. In this manner, the tree module 202 generates the clipping tree 320 as having a node for the first clipping group 310, a node for the second clipping group 312, and a node for the third clipping group 316. Accordingly, the clipping tree 320 illustrates a relative hierarchy of the first, second, and third clipping groups 310, 312, 316 in the input render tree 302. Notably, the first clipping group 310 and the second clipping group 312 have different levels in the render tree 318 and the first clipping group 310 and the second clipping group 312 have a same level in the clipping tree 320.

Figure 4:
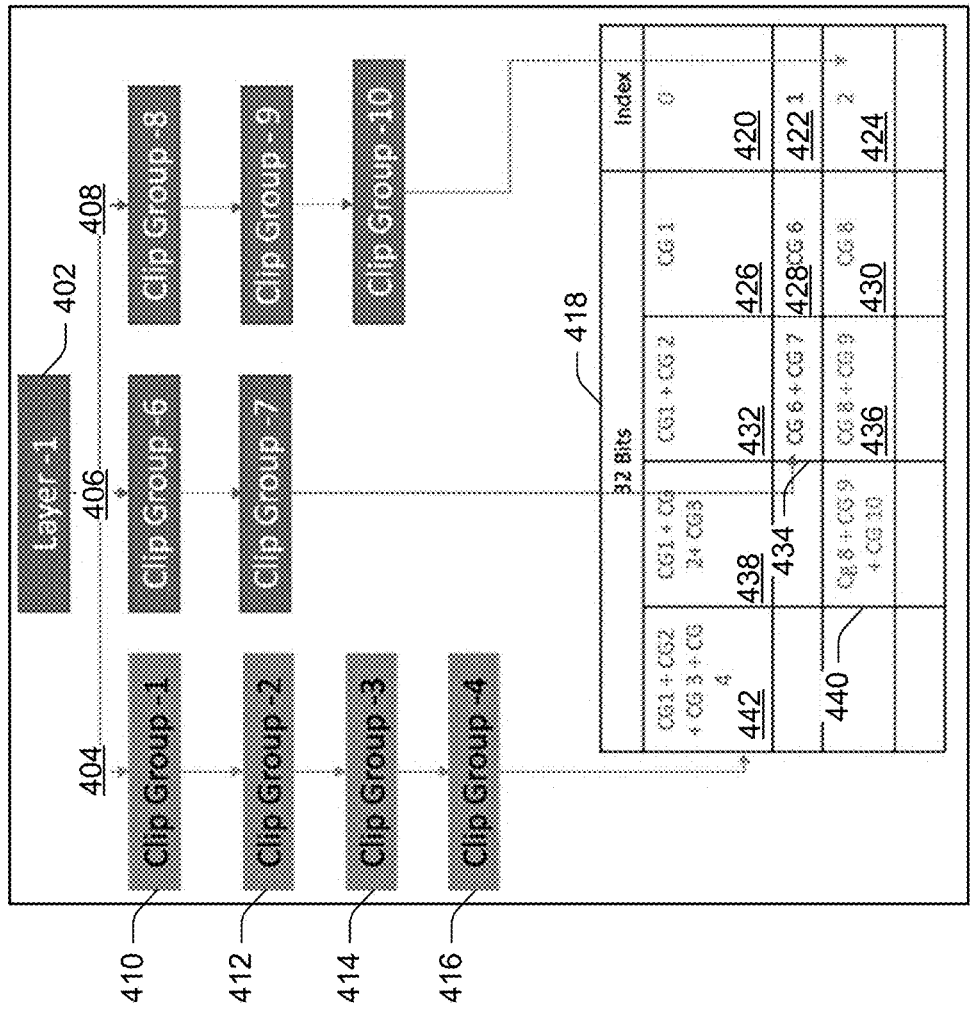
FIG. 4 illustrates a representation of generating a segment buffer based on a clipping tree.

For example, the tree module 202 generates one clipping tree for each layer included in the input render tree 302. In this example, the input render tree 302 only includes the layer 304, and the tree module 202 generates the clipping tree data 208 as describing the clipping tree 320. The segment module 204 receives and processes the clipping tree data 208 to generate buffer data 210. FIG. 4 illustrates a representation 400 of generating a segment buffer based on a clipping tree.

The representation 400 includes a clipping tree 402 of 9 clipping groups. For instance, the segment module 204 receives the clipping tree data 208 describing the clipping tree 402. As shown, the clipping tree 402 includes branches 404-408 (e.g., columns) and levels 410-416 (e.g., rows). Branch 404 includes clipping group 1, clipping group 2, clipping group 3, and clipping group 4; branch 406 includes clipping group 6 and clipping group 7; and branch 408 includes clipping group 8, clipping group 9, and clipping group 10. Similarly, level 410 includes clipping group 1, clipping group 6, and clipping group 8; level 412 includes clipping group 2, clipping group 7, and clipping group 9; level 414 includes clipping group 3 and clipping group 10; and level 416 includes clipping group 4.

In an example, the segment module 204 uses the clipping tree 402 to generate a segment buffer 418. The segment buffer 418 is a two-dimensional array that includes segments 420-442 which are written to and read from the segment buffer 418 by shaders or GPU kernels (e.g., of the GPU 114). For example, each of the segments 420-442 is denoted by a rowIndex and a columnIndex.

In some examples, the segment module 204 generates the segment buffer 418 such that each row of the two-dimensional array stores coverage of one of the branches 404-408 of the clipping tree 402. For example, the segment module 204 generates the segment buffer 418 such that each column of the two-dimensional array stores coverage of one of the levels 410-416 of the clipping tree 402. In this example, a leftmost column in the two-dimensional array stores coverage of nodes present at a bottommost level of the clipping tree 402.

In one example, this is representable as:

```
procedure FILLSEGMENTBUFFER(T, M)
    M ← Clear buffer with value 0
    rowID ← 0, colID ← 0, level ← 0
    Q ← queue holding clip nodes, S ← stack holding clip nodes
    and level
    Q ← Enqueue Clip Root from T
    Q ← Enqueue NULL
    while Q is not empty do
        ClipNode ← top of Q
        Q ← dequeue
        if ClipNode == NULL AND size of Q > 0 then
            level ← level + 1
            Q ← Enqueue NULL
        else
            S ← Push ClipNode, level
            Q ← Enqueue children of ClipNode
    while S is not empty do
        Get level from Stop
        for ClipNode at level do
            M[rowID][colID] = Coverage of ClipNode
            Cache rowID, colID into ClipNode
            rowID ← rowID + 1
        colID ← ColID + 1
``` where: T represents the clipping tree 402; and M represents the segment buffer 418.

In the illustrated example, the segment buffer 418 is a two-dimensional array of 4 rows and 4 columns and each of the segments 420-442 provides 8-bit storage. For example, with a 32-bit array for storing coverage and assuming 8 bits to denote coverage (e.g., K=8), then the segment module 204 is capable of storing up to 4 clipping groups in one row and the row memory is sufficient for storing all of the branches 402-408. In an example in which the memory is exceeded, then the segment module 204 rewinds the segment buffer 418. For instance, it is possible for a column order to be out of memory which occurs if a depth of any of the branches 404-408 is greater than a number of columns in the segment buffer 418. It is also possible for a row order to be out of memory which occurs if a number of the clipping groups included in any of the levels 410-416 is greater than a number of rows in the segment buffer 418.

Consider an example in which the segment buffer 418 runs out of memory when filling the segment buffer 418 for the clipping tree 402. In this example, the segment module 204 ceases processing of the clipping tree 402. The input render tree 302 is processed such that all objects included in the input render tree 302 for which the corresponding clipping tree 402 has been filled in the segment buffer 418 are drawn to an output buffer. The segment buffer 418 is then cleared in specific cells to make space for more clipping groups in the clipping tree 402. Notably, this interleaving of the clipping tree 402 and the input render tree 302 is not natural but is achievable as a result of a structure of the segment buffer 418, its fill order, and invariants defined for the structure of the segment buffer 418.

Returning to the example illustrated in the representation 400, the segment module 204 fills the segment buffer 418 by including row index 0 in segment 420; row index 1 in segment 422; and row index 2 in segment 424. For example, row index 0 corresponds to branch 404; row index 1 corresponds to branch 406; and row index 2 corresponds to branch 408. Segment 426 includes clipping group 1; segment 428 includes clipping group 6; and segment 430 includes clipping group 8. Similarly, segment 432 includes clipping group 1+clipping group 2; segment 434 includes clipping group 6+clipping group 7; and segment 436 includes clipping group 8+clipping group 9. Finally, segment 438 includes clipping group 1+clipping group 2+clipping group 3; segment 440 includes clipping group 8+clipping group 9+clipping group 10; and segment 442 includes clipping group 1+clipping group 2+clipping group 3+clipping group 4.

In an example, the segment module 204 generates the buffer data 210 as describing the segment buffer 418. The display module 206 receives and processes the buffer data 210 to compute coverage for clipping objects included in the input render tree 302. To do so in one example, the display module 206 maps the segment buffer 418 to graphics primitives. For applications relying on the GPU 114 graphics pipeline, accesses to the GPU 114 resident memory buffers are limited for the usage as the segment buffer 418. As a result, the display module 206 maps the segment buffer 418 to a two-dimensional array such as a texture array. In one example, dimensions of the texture array are selectable based on memory requirements and available system memory. In this example, each pixel storage of the texture array acts as a segment buffer for clipping groups contributing to that pixel.

For example, the display module 206 uses color channels in each plane of the texture array to act as columns of the segment buffer 418. A RGBA type of render texture provides 4 columns (8 bits per cell/segment) for the segment buffer 418 in one example. In another example, the display module 206 uses color planes of the texture array to act as rows of the segment buffer 418. A texture array of array length 4 provides 4 rows for the segment buffer 418 in this other example.

Consider an example in which write operations are performed from fragment shaders of a draw call executed for each clipping group, and a render call is passed additional information to locate a particular one of the segments 420-442 in the texture array to write coverage for each clipping group. In this example, the rowIndex and the columnIndex computed above are transformed to corresponding fragment coordinates and color plane indices which are then sent to the fragment shaders. In one example, this is representable as:

```
procedure SETCLIPMASKBUFFER (T, FBO, SB)
    Create Clip Render Tree CRT
    Attach SB to FBO
    Count ← 0
    SM ← Segment Mask to store buffer offset
    N ← Total available bits per pixel in segment buffer
    K ← Bits used for writing coverage value for single clipping group
    Offset ← Current bit offset in Segment Buffer, initialized to 0 while Count < (N/K) do for Each Clipping Group G in CRT do
            coverage ← Computed coverage for G
            SB [glFragCoord] = SB[glFragCoord] + (coverage << offset)
            SM insert (G, offset)
            offset ← offset + k
        Count ← Count + 1
``` where: T represents the input render tree 302; FBO represents textures; and SB corresponds to a framebuffer with segment buffer SB.

Continuing the above example, the input render tree 302 is processed in standard z-order, and every node in the input render tree 302 contains information of a nearest clipping group in its parent hierarchy. The display module 206 assigns a unique identifier to each clipping group and stores a mapping of each unique identifier to a location in the segment buffer 418. Given a clipping group identifier and this mapping, it is possible for the display module 206 to access a segment storing its coverage in the segment buffer 418.

Figure 5:
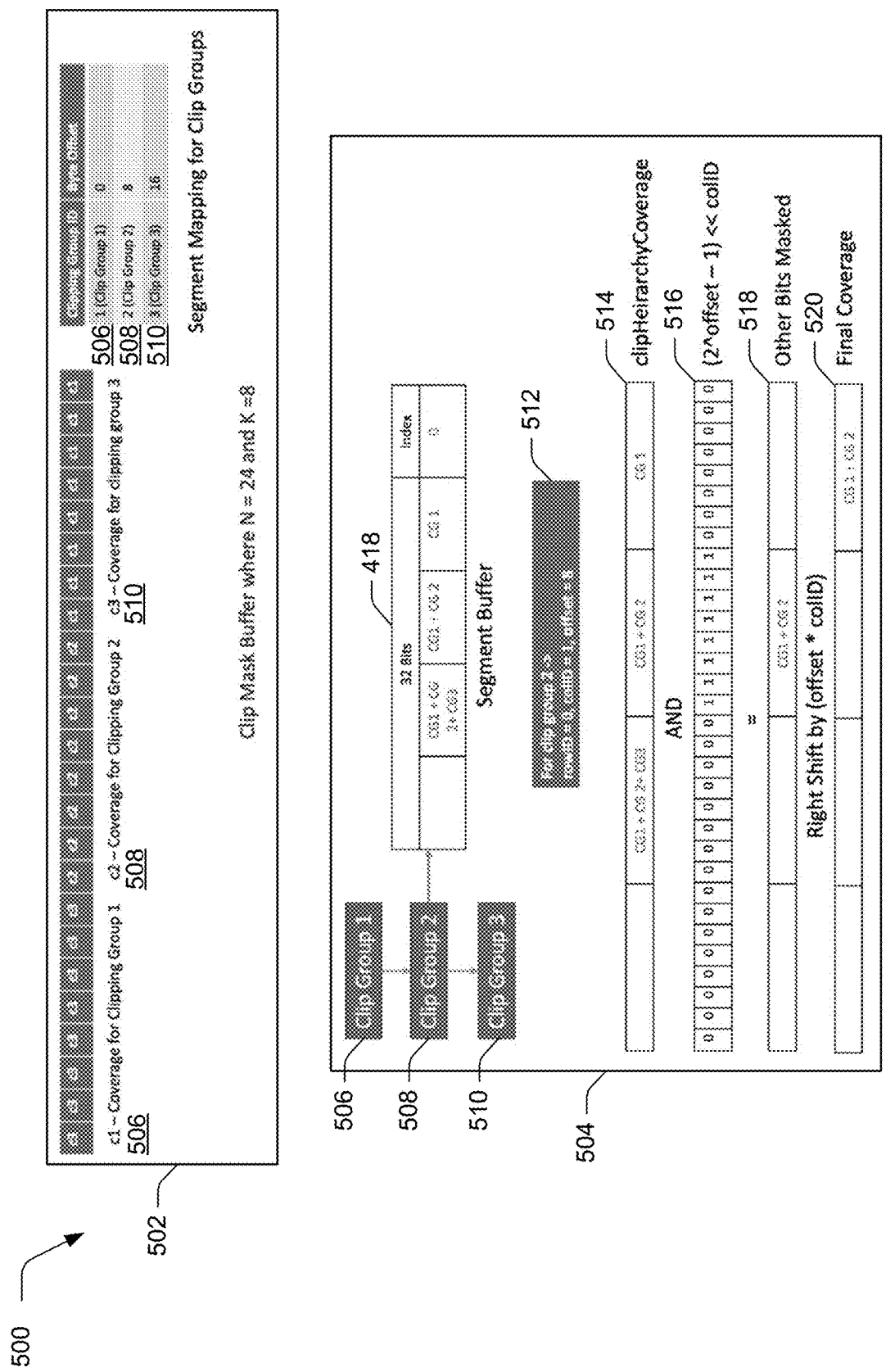
FIG. 5 illustrates a representation of computing coverage for a clipping object of a clipping group included in an input render tree.

FIG. 5 illustrates a representation 500 of computing coverage for a clipping object of a clipping group included in an input render tree. As shown, the representation 500 includes an example 502 of mapping segments and clipping groups and an example 504 of reading coverage values in a fragment shader. For instance, the example 502 includes a first clipping group 506, a second clipping group 508, and a third clipping group 510 with N=24 and K=8. The first clipping group 506 has coverage c1, a unique identifier of 1, and a bit offset of 0; the second clipping group 508 has coverage c2, a unique identifier of 2, and a bit offset of 8; and the third clipping group 510 has coverage c3, a unique identifier of 3, and a bit offset of 16. This information 512 for the second clipping group 508 is included near a portion of the segment buffer 418 in the example 504.

For example, in order to compute coverage for a clipping object in the second clipping group 508, the display module 206 extracts a row 514 from the texture array based on the row index 0 in the segment 420. The display module 206 extracts the row 514 because for each node included in the input render tree 302, its contributing coverage is equal to a union of coverage of all clipping groups in a parent hierarchy. In an example, the invariants defined for the segment buffer 418 automatically align coverage of all groups in any parent hierarchy in contiguous byte order which is directly readable from shaders.

The display module 206 computes a bit mask 516 using the bit offset of 8 for the second clipping group 508. In one example, the display module computes the bit mask 516 as $(2^{offset}-1) \ll colID$. For example, the display module 206 performs an AND operation between the row 514 and the bit mask 516 which masks out bits included in the row 514 that do not contribute to coverage of clipping objects in the second clipping group 508 such that contributing bits 518 remain that contribute to the coverage of the clipping objects in the second clipping group 508. The display module 206 computes final coverage 520 for the clipping objects in the second clipping group 508 by right shifting the contributing bits 518 by an amount computed as offset*colID which is 8*1=8 in the example 504.

In an example, this is representable as:

```
procedure DRAWRENDERTREE (T, FBO)
    while (All art in T is not rendered) do
        SM ← Segment Mask to store buffer offset
        SetClipMaskBuffer (T, FBO, CM)
        Attach C back to FBO
        Send CM, SM as uniforms to Fragment shader
    while art in Render tree T and N
    ─ Clipping Group not rendered do
    K if art is in clipping group then
        val = TexelFetch (CM, glFragCord)
        offset = SM (art)
        coverage = Get K bits at offset from val
    Draw art
    Reset CM
``` where: T represents the input render tree 302; FBO represents textures; and CM corresponds to a framebuffer with Clipping Mask CM and Color C.

Figure 6:
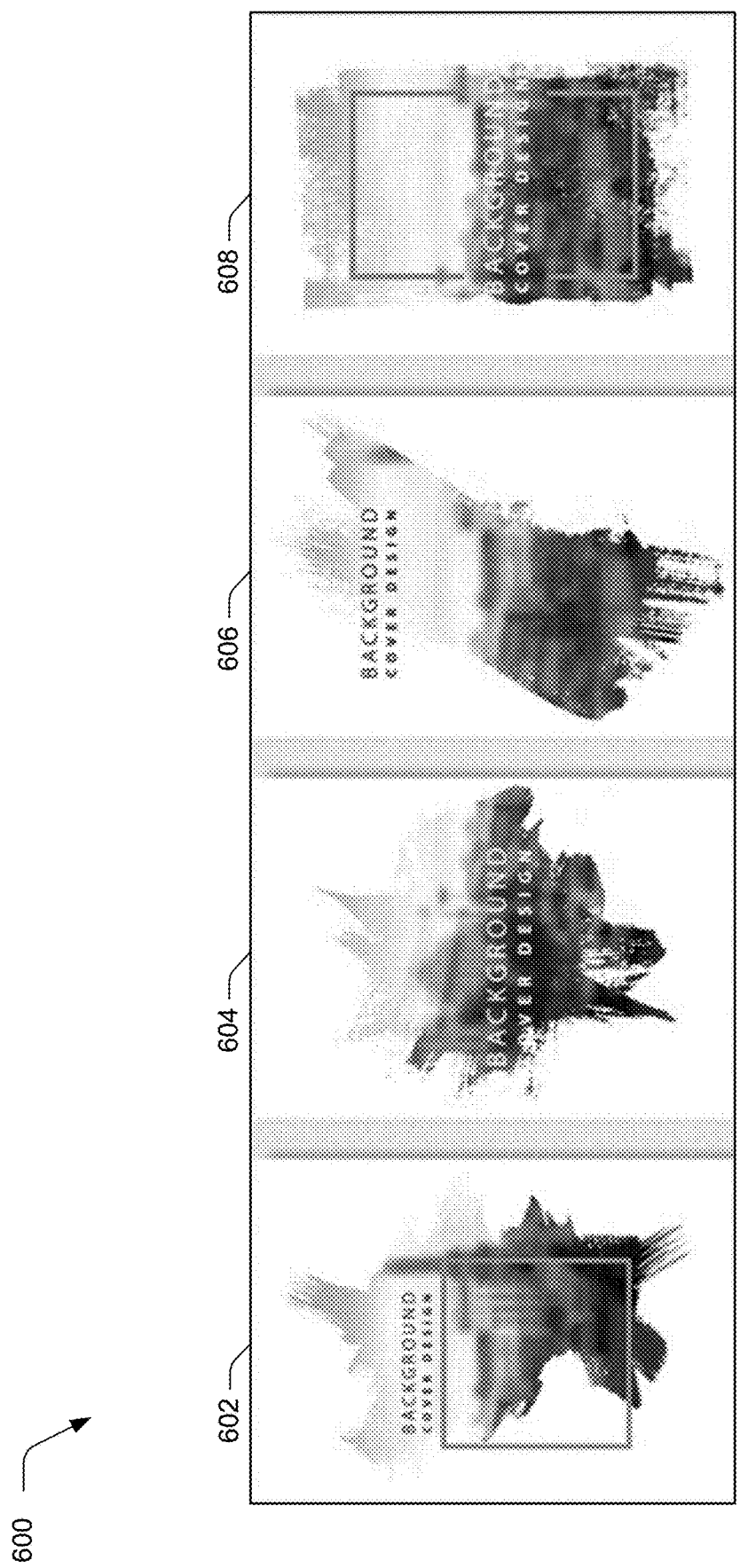
FIG. 6 illustrates a representation of efficiently rendered clipping objects.

FIG. 6 illustrates a representation 600 of efficiently rendered clipping objects. The display module 206 uses the final coverage 520 to render digital images 602-608 that include clipping objects in the user interface 136. For example, the display module 206 renders the digital images 602-608 by issuing draw calls to an output buffer. In an example, the display module 206 generates the digital images 602-608 by removing a read-after-write dependency caused by computing coverage for a pixel based on coverage of a clipped path as well as coverage of a clipping path at the pixel in conventional rendering techniques. In this example, the display module 206 draws the input render tree 302 by indexing into the segment buffer 418 during a fragment shader stage of the graphics pipeline which significantly increases a display rate for the digital images 602-608 in the user interface 136 relative to rendering the digital images 602-608 using the conventional rendering techniques.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
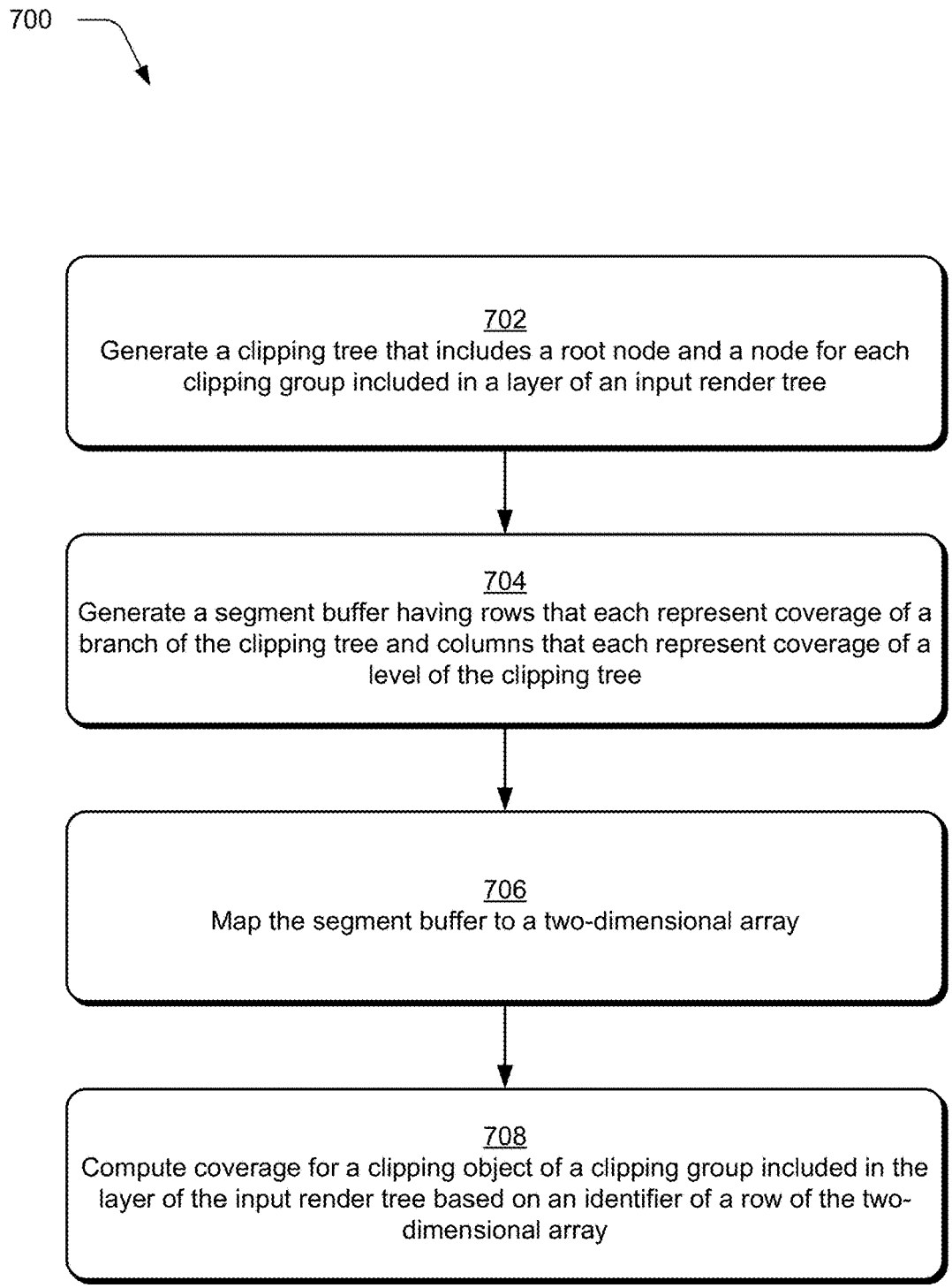
FIG. 7 is a flow diagram depicting a procedure in an example implementation in which coverage for a clipping object of a clipping group included in an input render tree is computed using an identifier of a row of a two-dimensional array.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which coverage for a clipping object of a clipping group included in an input render tree is computed using an identifier of a row of a two-dimensional array.

A clipping tree is generated that includes a root node and a node for each clipping group included in a layer of an input render tree (block 702). For example, the computing device 102 implements the clipping module 110 to generate the clipping tree. A segment buffer is generated having rows that each represent coverage of a branch of the clipping tree and columns that each represent coverage of a level of the clipping tree (block 704). In some examples, the clipping module 110 generates the segment buffer.

The segment buffer is mapped to a two-dimensional array (block 706). In one example, the computing device 102 implements the clipping module 110 to map the segment buffer to the two-dimensional array. Coverage is computed for a clipping object of a clipping group included in the layer of the input render tree based on an identifier of a row of the two-dimensional array (block 708). For example, the clipping module 110 computes the coverage for the clipping object.

FIG. 8 is a flow diagram depicting a procedure 800 in an example implementation in which coverage for a clipping object of a clipping group included in an input render tree is computed using a bit mask that masks out bits included in a row that do not contribute to the coverage for the clipping object. A clipping tree is generated having nodes corresponding to clipping groups included in an input render tree (block 802). In an example, the computing device 102 implements the clipping module 110 to generate the clipping tree.

A segment buffer is generated having rows that each represent coverage of a branch of the clipping tree and columns that each represent coverage of a level of the clipping tree (block 804). For example, the clipping module 110 generates the segment buffer. A row is extracted from the segment buffer based on a row identifier of the row (block 806). The computing device 102 implements the clipping module 110 to extract the row from the segment buffer in some examples. Coverage is computed for a clipping object of a clipping group included in the input render tree using a bit mask that masks out bits included in the row that do not contribute to coverage for the clipping object (block 808). In one example, the clipping module 110 computes the coverage for the clipping object.

Figure 9A:
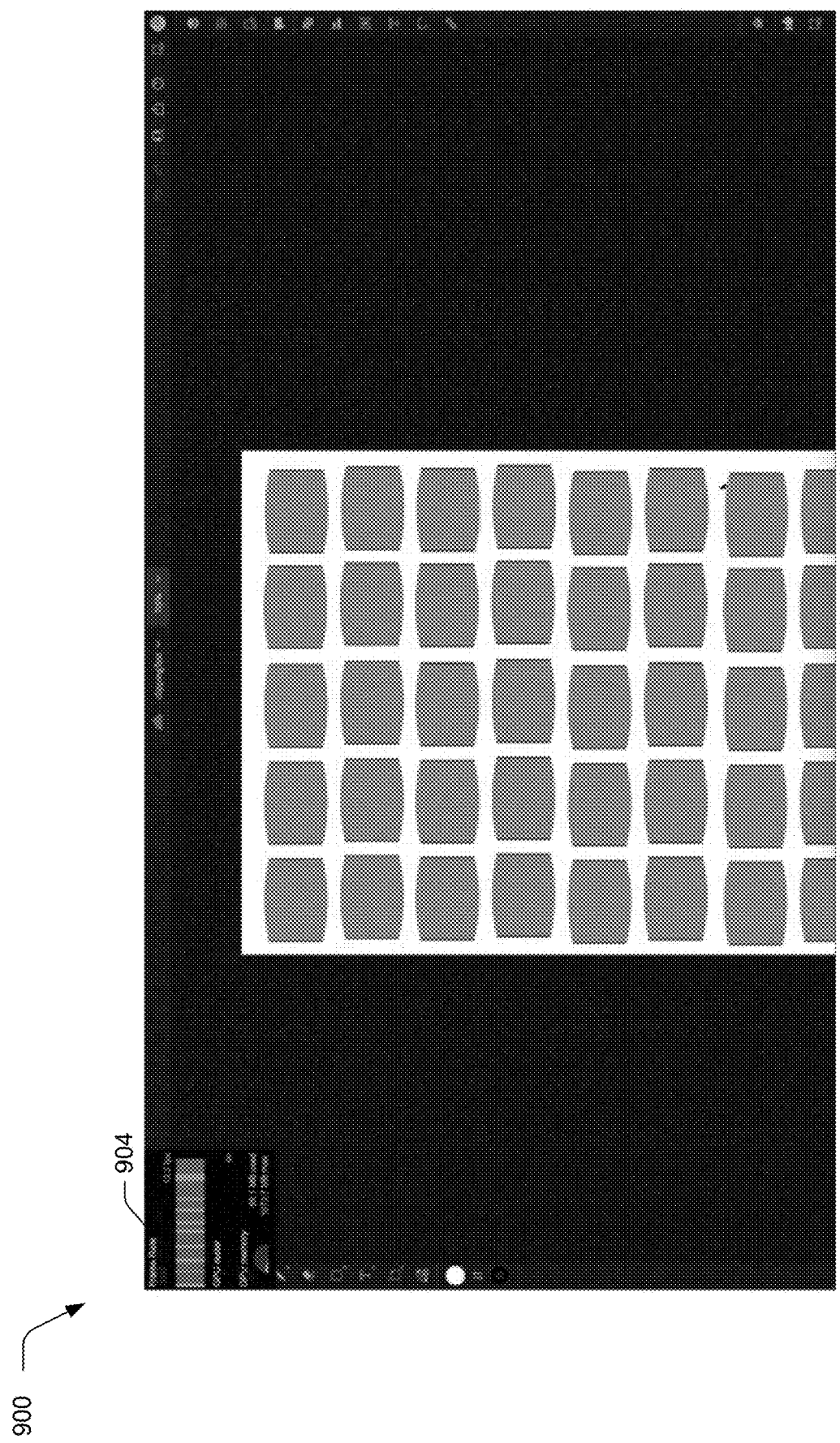
FIGS. 9A and 9B illustrate representations of improvements of the described systems for efficient rendering of clipping objects relative to conventional systems for rendering clipping objects.
Figure 9B:
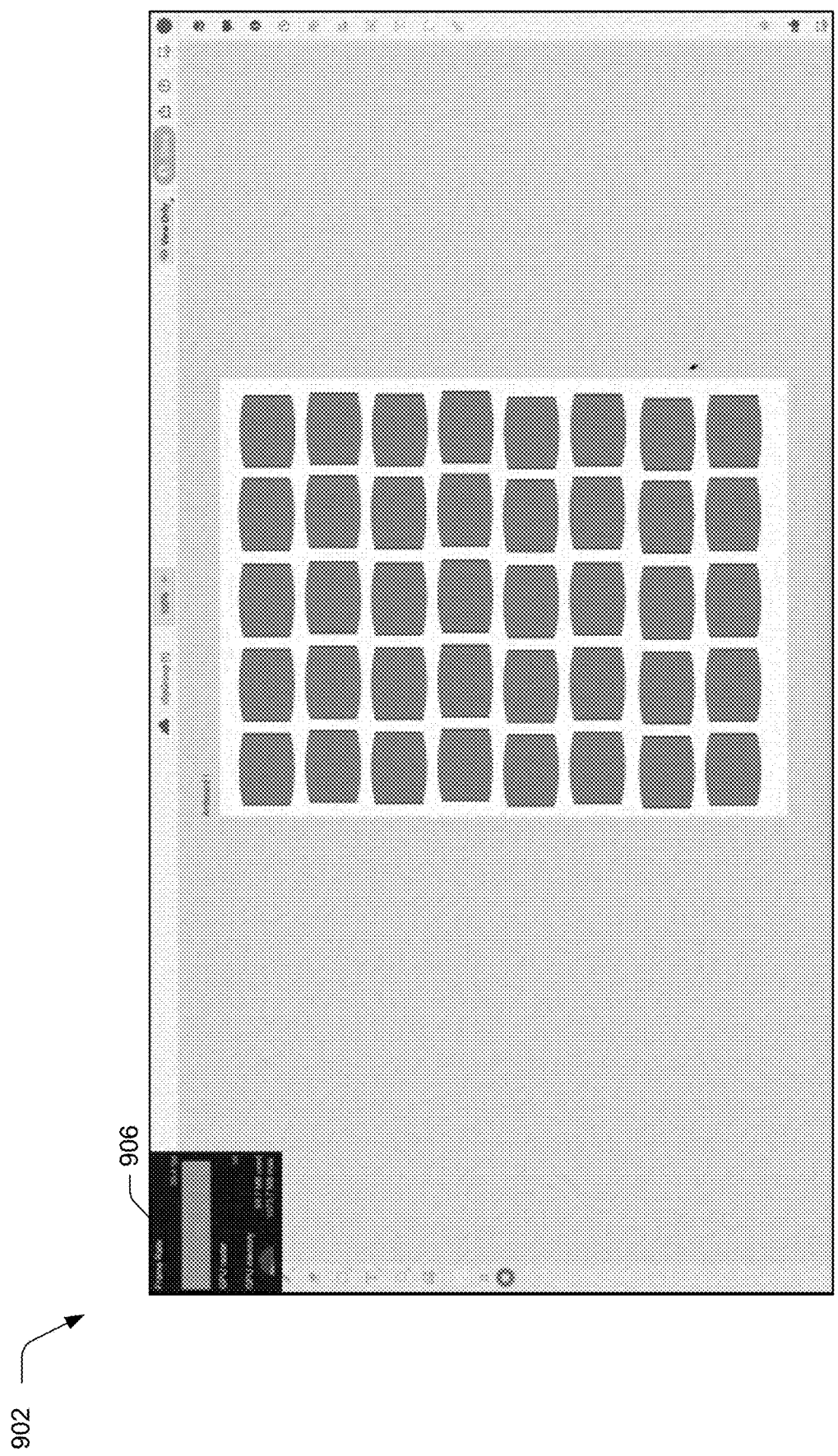

FIGS. 9A and 9B illustrate representations of improvements of the described systems for efficient rendering of clipping objects relative to conventional systems for rendering clipping objects. FIG. 9A illustrates a representation 900 of clipping objects rendered using conventional rendering systems. FIG. 9B illustrates a representation 902 of clipping objects rendered using the described systems for efficient rendering of clipping objects. As shown in the representation 900, the conventional rendering systems are capable of displaying rendered clipping objects at a conventional display rate 904. For example, the conventional display rate 904 is 13.2 frames per second. However, in the representation 902, the described systems for efficient rendering of clipping objects are capable of displaying rendered clipping objects at an improved display rate 906. In the illustrated example, the improved display rate 906 is 59.4 frames per second. For instance, the improved display rate 906 is approximately 4.5 times faster than the conventional display rate 904.

Example System and Device

Figure 10:
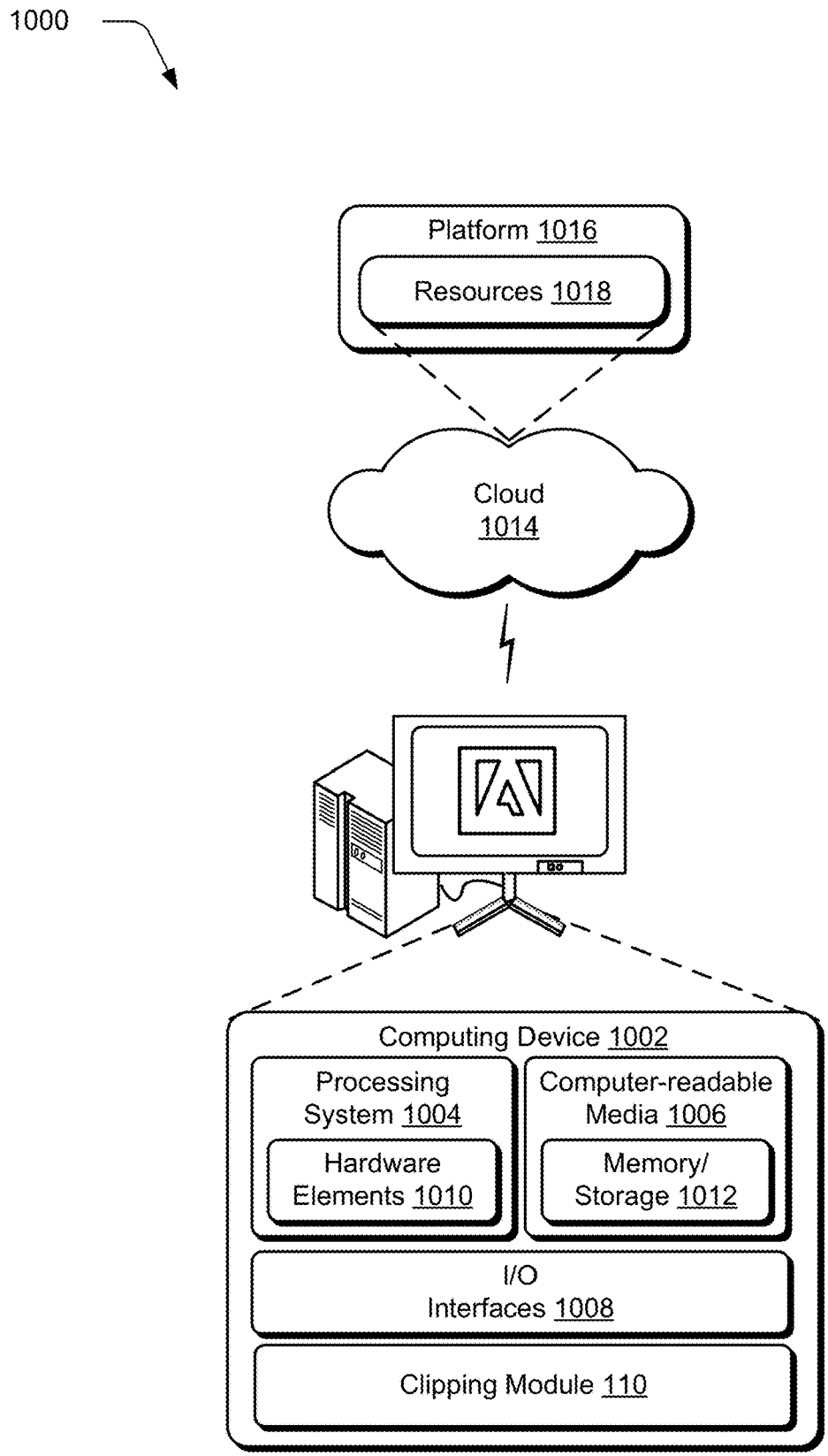
FIG. 10 illustrates an example system that includes an example computing device that is representative of one or more computing systems and/or devices for implementing the various techniques described herein.

FIG. 10 illustrates an example system 1000 that includes an example computing device that is representative of one or more computing systems and/or devices that are usable to implement the various techniques described herein. This is illustrated through inclusion of the clipping module 110. The computing device 1002 includes, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage 1012 includes volatile media (such as random access memory (RAM)) and/or nonvolatile media (such as read only memory (ROM), Flash memory, optical disks, magnetic disks, and so forth). In another example, the memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although implementations of systems for efficient rendering of clipping objects have been described in language specific to structural features and/or methods, it is to be understood that the appended claims are not necessarily limited to the specific features or methods described. Rather, the specific features and methods are disclosed as example implementations of systems for efficient rendering of clipping objects, and other equivalent features and methods are intended to be within the scope of the appended claims. Further, various different examples are described and it is to be appreciated that each described example is implementable independently or in connection with one or more other described examples.

What is claimed is:

1. A method comprising:
   generating, by a computing device, a clipping tree that includes a root node and a node for each clipping group included in a layer of an input render tree;
   generating, by the computing device, a segment buffer having rows that each represent coverage of a branch of the clipping tree and columns that each represent coverage of a level of the clipping tree;
   mapping, by the computing device, the segment buffer to a two-dimensional array; and
   computing, by the computing device, coverage for a clipping object of a clipping group included in the layer of the input render tree based on an identifier of a row of the two-dimensional array.

2. The method as described in claim 1, wherein the coverage for the clipping object is computed using a bit mask that masks out bits included in the row of the two-dimensional array that do not contribute to the coverage for the clipping object.

3. The method as described in claim 1, wherein the coverage for the clipping object is computed using an identifier of a column of the two-dimensional array and an offset.

4. The method as described in claim 1, wherein the two-dimensional array is a texture array.

5. The method as described in claim 4, wherein the rows of the segment buffer are mapped to color planes.

6. The method as described in claim 4, wherein the columns of the segment buffer are mapped to color channels.

7. The method as described in claim 1, further comprising:
exceeding at least one of a number of the rows or a number of the columns of the segment buffer;
issuing a draw call to an output buffer for the clipping object; and
clearing a segment of the segment buffer.

8. The method as described in claim 1, wherein a first clipping group and a second clipping group have different levels in the input render tree and a same level in the clipping tree.

9. The method as described in claim 1, further comprising determining a color of a pixel of a clipped object based on the coverage for the clipping object.

10. The method as described in claim 1, further comprising assigning a unique identifier to a clipping group included in the layer of the input render tree that is usable to identify a segment of the segment buffer storing coverage of the clipping group.

11. A system comprising:
a memory component; and
a processing device coupled to the memory component, the processing device to perform operations comprising:
generating a clipping tree that includes a root node and a node for each clipping group included in a layer of an input render tree;
generating a segment buffer having rows that each represent coverage of a branch of the clipping tree and columns that each represent coverage of a level of the clipping tree;
mapping the segment buffer to a two-dimensional array; and
computing coverage for a clipping object of a clipping group included in the layer of the input render tree based on an identifier of a row of the two-dimensional array.

12. The system as described in claim 11, wherein a color of a pixel of a clipped object is determined based on the coverage for the clipping object.

13. The system as described in claim 11, wherein the coverage for the clipping object is computed using a bit mask that masks out bits included in the row of the two-dimensional array that do not contribute to the coverage for the clipping object.

14. The system as described in claim 11, wherein the coverage for the clipping object is computed using an identifier of a column of the two-dimensional array and an offset.

15. The system as described in claim 11, wherein a unique identifier is assigned to a clipping group included in the layer of the input render tree that is usable to identify a segment of the segment buffer storing coverage of the clipping group.

16. A non-transitory computer-readable storage medium storing executable instructions, which when executed by a processing device, cause the processing device to perform operations comprising:
generating a clipping tree having nodes corresponding to clipping groups included in an input render tree;
generating a segment buffer having rows that each represent coverage of a branch of the clipping tree and columns that each represent coverage of a level of the clipping tree;
extracting a row from the segment buffer based on a row identifier of the row; and
computing coverage for a clipping object of a clipping group included in the input render tree using a bit mask that masks out bits included in the row that do not contribute to the coverage for the clipping object.

17. The non-transitory computer-readable storage medium as described in claim 16, wherein the coverage for the clipping object is computed by shifting bits included in the row that contribute to the coverage for the clipping object based on a column identifier and an offset.

18. The non-transitory computer-readable storage medium as described in claim 16, wherein the segment buffer is mapped to a two-dimensional texture array.

19. The non-transitory computer-readable storage medium as described in claim 18, wherein the rows of the segment buffer are mapped to color planes and the columns of the segment buffer are mapped to color channels.

20. The non-transitory computer-readable storage medium as described in claim 16, wherein a color of a pixel of a clipped object is determined based on the coverage for the clipping object.

* * * * *